United States Patent
Hellmann et al.

(10) Patent No.: US 6,836,705 B2
(45) Date of Patent: Dec. 28, 2004

(54) METHOD AND DEVICE FOR THE CONTROL AND/OR THE DETERMINATION OF A VERSION OF A CONTROLLER IN A SYSTEM

(75) Inventors: Manfred Hellmann, Hardthof (DE); Thilo Beck, Stuttgart (DE); Simone Kriso, Oberriexingen (DE); Ralph Lauxmann, Korntal-Muenchingen (DE); Albrecht Irion, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 10/258,145
(22) PCT Filed: Apr. 6, 2001
(86) PCT No.: PCT/DE01/01341
§ 371 (c)(1),
(2), (4) Date: Mar. 25, 2003
(87) PCT Pub. No.: WO01/79947
PCT Pub. Date: Oct. 25, 2001

(65) Prior Publication Data
US 2003/0158634 A1 Aug. 21, 2003

(30) Foreign Application Priority Data
Apr. 17, 2000 (DE) .......................................... 100 19 208

(51) Int. Cl.$^7$ ................................................ G06F 7/00
(52) U.S. Cl. ............................. 701/1; 701/48; 701/114; 340/3.1; 340/5.21
(58) Field of Search ................................. 701/96, 1, 48, 701/54, 114; 340/5.21, 3.1, 3.44, 459, 5.22, 5.3, 5.54, 5.64

(56) References Cited

U.S. PATENT DOCUMENTS

| 5,278,547 A | * | 1/1994 | Suman et al. ............... 340/5.22 |
| 5,369,584 A | * | 11/1994 | Kajiwara ..................... 701/48 |
| 5,513,107 A | | 4/1996 | Gormley |

FOREIGN PATENT DOCUMENTS

| DE | 37 38 915 | 5/1989 |
| DE | 43 15 494 | 9/1994 |

* cited by examiner

Primary Examiner—Gertrude A. Jeanglaude
(74) Attorney, Agent, or Firm—Kenyon & Kenyon

(57) ABSTRACT

A method and a device is described as well as a component for controlling a system, in particular in a motor vehicle, the control being implementable in different variants, a component being operable in different variants according to the variants of the control, and the component receiving at least one signal via an interface. The component is introduced into a system environment and adapted to this system environment and/or initialized with this system environment as a system, in that the variant of the system environment is determined. This is done in a system-immanent manner. When the component is first started, the variant is altered and/or preselected one time as a function of the at least one signal, in particular by the component itself. Any other change in and/or selection of the variant following the initial startup is possible only with authorization.

17 Claims, 3 Drawing Sheets

METHOD AND DEVICE FOR THE CONTROL AND/OR THE DETERMINATION OF A VERSION OF A CONTROLLER IN A SYSTEM

FIELD OF THE INVENTION

The present invention relates to a method and a device for controlling and/or determining a variant of a control of a system, a component being capable of being operated and/or implemented in different variants according to the variants of the control.

BACKGROUND INFORMATION

German Published Patent Application No. 37 38 915 describes a universally usable control unit for control systems. On the basis of an external command, the universal control unit used determines, after assembly, which system configuration is present and then stores this information. Such a universal control unit is then configured for the most complex control system, depending on the objective, and therefore its capabilities may not be fully utilized when using a simpler control system configuration. However, this flexible approach may also involve security risks. For reasons of system security, it may often be required to ensure that only authorized entities enter or manipulate the vehicle variants.

To minimize this security risk, external programming devices or diagnostic devices which are not available to the general public may be used, for example, for programming the data and/or programs. To this end, German Published Patent Application No. 42 11 650 describes a method of variant coding for multiple interlinked control units, in automobiles in particular. The variant identifications for selection of different variants of program data and/or operating data of the individual control units are transmitted from the external programming device or diagnostic device to a certain control unit of the set of control units. Then the variant identifications are transmitted from this specific control unit to the other control units, using a bus system connecting the control units. Each variant identification transmitted is then stored in a memory of the control unit assigned to it at least for the duration of the operation of the control units. A separate control unit program is provided for each variant. This option may be complex, e.g., with respect to development and testing, maintenance, repairs, etc. and therefore may be cost-intensive.

In many applications, it may be desirable to configure the control of a system, i.e., the programs and/or data, to be flexible, so that it may be easily adapted for a large bandwidth of different system variants, because different system variants may require different data. At the same time, the security risk and the possibility of manipulation may be minimized.

SUMMARY OF THE INVENTION

The present invention is directed at a method and a device for controlling a system and/or determining a variant of a control of a system, in particular in a motor vehicle, where the control may be implemented in different variants, and one component may be operated in different variants according to the variants of the control, and the component may receive at least one signal over an interface.

When the component is first started, the variant may be adapted and/or preselected as a function of the at least one signal, and any other change in and/or selection of the variant following the first startup may be performed only with authorization. The component here may correspond to a control unit and/or intelligent sensors and/or intelligent actuators.

The security risk or manipulation risk may be avoided as in the related art inasmuch as upon first startup of the component, it automatically determines the variant once only according to the at least one signal received by the component. If the component is installed into an existing system environment, i.e., connected to at least one additional component, the component receives the at least one signal from the additional component via the connecting interface, thus avoiding any confusion in the programming data, i.e., coding data, e.g., in the case of external access, because the determination of the variant, i.e., the corresponding control is implemented in a system-immanent manner.

Expediently, at least one variable representing the variant and/or the signal may be written to a memory of the component on the basis of which the variant is determined, such as, for example, by the component itself.

The authorization may be performed by checking an identification, i.e., the presence or absence of an identification in the memory of the component. By simply checking for the presence or absence of the identifier and/or the data, storage of the identifier and/or the data itself may be used more or less as admission to the authorization step.

The component, in particular the electronic control unit, may recognize the relevant variant of the control automatically, thus precluding any confusion of data, because the variant determination may be performed, for example, in a system-immanent manner.

Therefore, the compatibility of a plurality of partner components, in particular partner control units as well as other components, may be ensured.

In addition, it may also be ensured for reasons of manipulation prevention, for example, that once a component has been installed in a system, it may not readily be installed in another system environment. Monitoring of the data stored once only thus may ensure that the system environment corresponds to the learned data.

Making a controlled change in and/or selection of the stored data and thus of the variant exclusively through authorization, e.g., through an authorized tool, nevertheless may make it possible to transfer the component to another system environment, although this may need to be done by an authorized entity.

DETAILED DESCRIPTION

Control and/or determination of the variant of a system control in a motor vehicle is described below as an example embodiment, in particular that of a system as part of an adaptive cruise control system.

However, these considerations may be equally applicable to other systems, e.g., machines, in particular machine tools. The system presented here in the case of variant determination of the component, in particular in installation in a system having multiple interlinked components, as is the case with machine tools, e.g., machining centers in particular, may be applicable to systems in general and may also be scaled up, e.g., to production equipment.

In the following, this example method and device are explained on the basis of an automotive component and an automotive system environment, i.e., on the basis of an automotive system on the whole.

Figure 1:
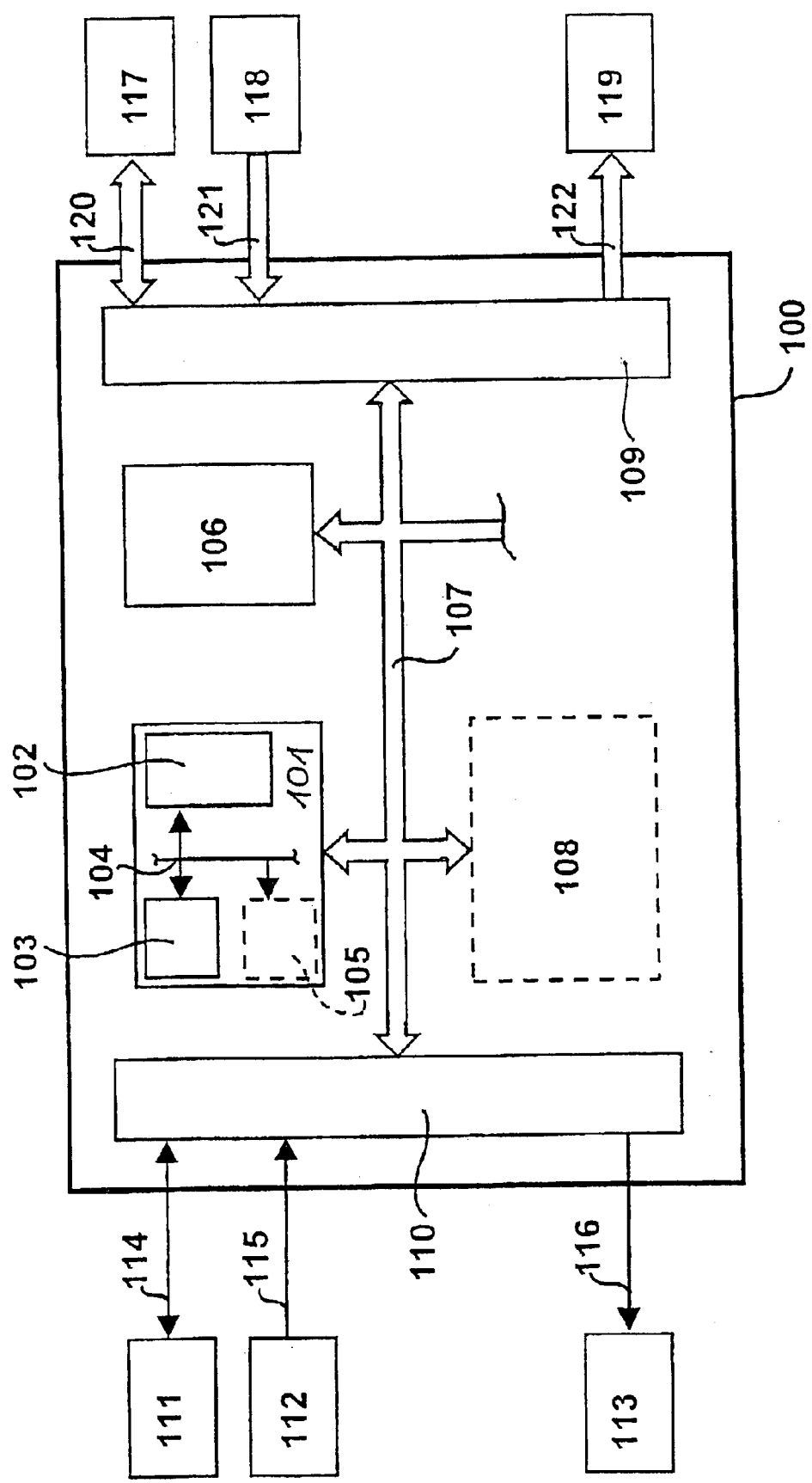
FIG. 1 shows an example embodiment of a component according to the present invention in the form of a control unit as well as an example embodiment of peripherals for implementation of a control of operating sequences, in particular in a motor vehicle.

FIG. 1 shows a general example of a component 100, e.g., a control unit in a vehicle, where 111 through 113 and 117 through 119 denote schematically its optional peripherals having their respective optional interfaces 114 through 116 and 120 through 122. Such a control unit may be used, for example, to control a drive unit, a transmission, a brake system or an adaptive cruise control system, etc.

In this example, control unit 100 includes a serial input/output module 110 and/or a parallel input/output module 109. Peripheral elements represented by peripheral element 111 are connected serially and bidirectionally, represented by connection 114, to serial input/output module 110. Peripheral element 111 represents peripheral elements such as intelligent sensors or actuators as well as integrated peripheral elements having sensors and actuators or additional control units connectable via serial interfaces. Additional peripheral elements, represented by element 112, in particular sensors, are connected unidirectionally to control unit 100 by connection 115 and supply measured values or measurement results, e.g., in particular in processed or preprocessed form, to control unit 100. Likewise, peripheral elements, in particular actuators, represented by element 113, are triggered serially by control unit 100 via input/output module 110. Connection 116 represents unidirectional signal transmission to actuators 113.

Along with or instead of the serial connection side, control unit 100 in this example may have at least one parallel connection side, represented by input/output module 109. Peripheral elements, represented by element 117, are connected to it in parallel and bidirectionally, represented by connection 120. This may be a bus system in a motor vehicle, to which sensors and actuators that are connectable in parallel as well as additional control units of the vehicle, represented by peripheral element 117, are connectable. Likewise, additional peripheral elements may be connected to control unit 100 unidirectionally and in parallel, represented by element 118 and connection 121, the signals of which are transmitted only to the control unit. Likewise, other peripheral elements may also be provided, in particular actuators, represented by element 119, and connection or interface 122, which are operated by control unit 100 only in parallel and unidirectionally.

The peripheral element presented here as well as the connection module are in principle optional and are included or omitted, depending on the configuration of the control unit, i.e., different control units in the motor vehicle, depending on the application.

The same thing may also be true of the other elements which are represented in control unit 100 itself. Their presence or absence or combination varies according to the control unit and/or control function in the vehicle. Element 101 includes at least one microcomputer, which in turn contains a processor unit 103 and an internal memory 102, in particular a flash memory or an internal register bank. In addition, the internal memory is configured as a nonvolatile memory, in particular a flash memory. However, on-chip memory 102 may also be an EPROM, EEPROM, etc. Processor unit 103 and memory 102 are interconnected by an internal conductor system, or, bus system 104 and are connected to other optional components 105, such as an interface unit, a separate internal power supply, additional memories, processor units, i.e., coprocessors, etc. in microcomputer 101.

Microcomputer 101 is connected to other components, e.g., input/output modules 109 and 110, for example by at least one conductor/bus system 107 internally inside the control unit. An additional memory arrangement, in particular a nonvolatile memory such as an EEPROM or a flash EPROM, EPROM, PROM or ROM labeled as 106 in general is also present in control unit 100 and is connected to bus system 107. In the following, we have assumed an EEPROM, but other nonvolatile memories and in particular erasable memories, in particular a flash EPROM, may also be provided. The allocation of programs and/or data between memory 102 and memory 106 may be preselected as desired, and in the extreme case the programs and/or data may also be implemented completely in one memory or the other.

Additional optional components which are not shown in detail for the sake of simplicity are represented by element 108. These may be, for example, additional microcomputers, additional processor units, additional storage means, internal sensors, e.g., for temperature monitoring and/or sensors integrated into the control unit, e.g., a radar sensor in the case of an adaptive cruise control, at least one power supply, etc.

A system like that shown in FIG. 1 and/or comparable systems may be used to control operating sequences in a vehicle. These may be used in particular to control a drive unit or the entire power train, in particular for transmission control, to control a brake system or to control display, comfort and safety systems, etc.

Such a control unit may be used, for example, as part of an adaptive cruise control system in a motor vehicle. Such a regulation system may regulate and/or monitor a previously set driving speed and/or a previously set distance from a vehicle ahead or from objects in the direction of travel and may do so without intervention on the part of the driver. This may occur with appropriate consideration of the environment of the vehicle and optionally additional parameters such as, for example, the weather conditions and visibility conditions, optionally detected by the sensors. Such a regulation system and/or adaptive cruise control system (ACC system) may need to be flexible enough, in particular with regard to the constant increase in traffic density today, to be able to respond suitably to all driving situations. This in turn may require suitable object detection sensors to supply the measured data required for the regulation system in all driving situations. These sensors may be accommodated outside the control unit or also inside the control unit, i.e., the housing for the control unit, which thus forms a complete compact system.

Figure 2:
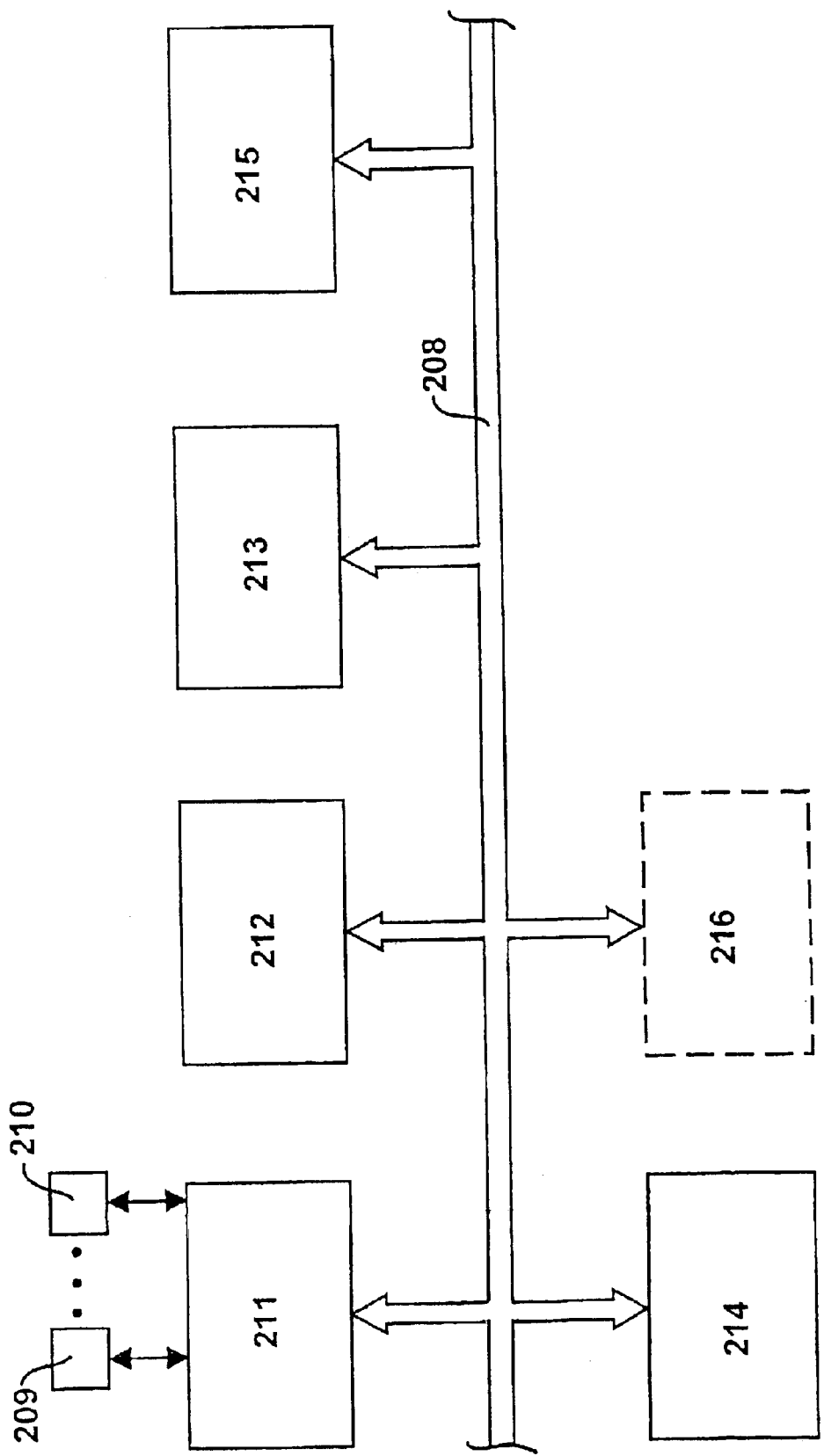
FIG. 2 illustrates the tie-in of such a control unit from FIG. 1 into a system environment.

Such a system, like that illustrated in FIG. 2, differs according to the type of vehicle and/or control functionality, i.e., the variants of control of the system as well as the individual control units. If one component, in particular a control unit, here an ACC control unit 214, is to be introduced into a system environment, here consisting of components 211 through 213 and 215 through 216, connected via bus system 208, the control functions of control unit 214 and/or the computer program of this electronic control unit may be configured to be so flexible that it may be adapted easily to vehicles for a large bandwidth, because different vehicle types may also require different data at least to some extent. The other system components may include, for example, an engine control 211, e.g., having an rpm or torque acquisition arrangement 209 and a throttle valve actuator 210, etc., a display unit 212, in particular a combination instrument, a control for the brake intervention measure, i.e., driving stability unit 213, a transmission control unit 215 and optionally additional components 216 in the form of additional control units, sensors or actuators.

The components of the system, i.e., the system environment, exchange signals, i.e., data, over bus system 208. This data of the system environment, i.e., components 211 through 213, 215 and 216, is referred to in the following as environment data or environment signals. According to the present invention, component 214, i.e., the ACC control unit here, automatically detects and/or determines the variant from the environment data and enters it once only into the corresponding memory area, e.g., nonvolatile memory 106. This environment data is information received by electronic control unit 214 through communication with the system environment, i.e., the other components, in other words, control units, sensors, actuators, etc.

Figure 3:
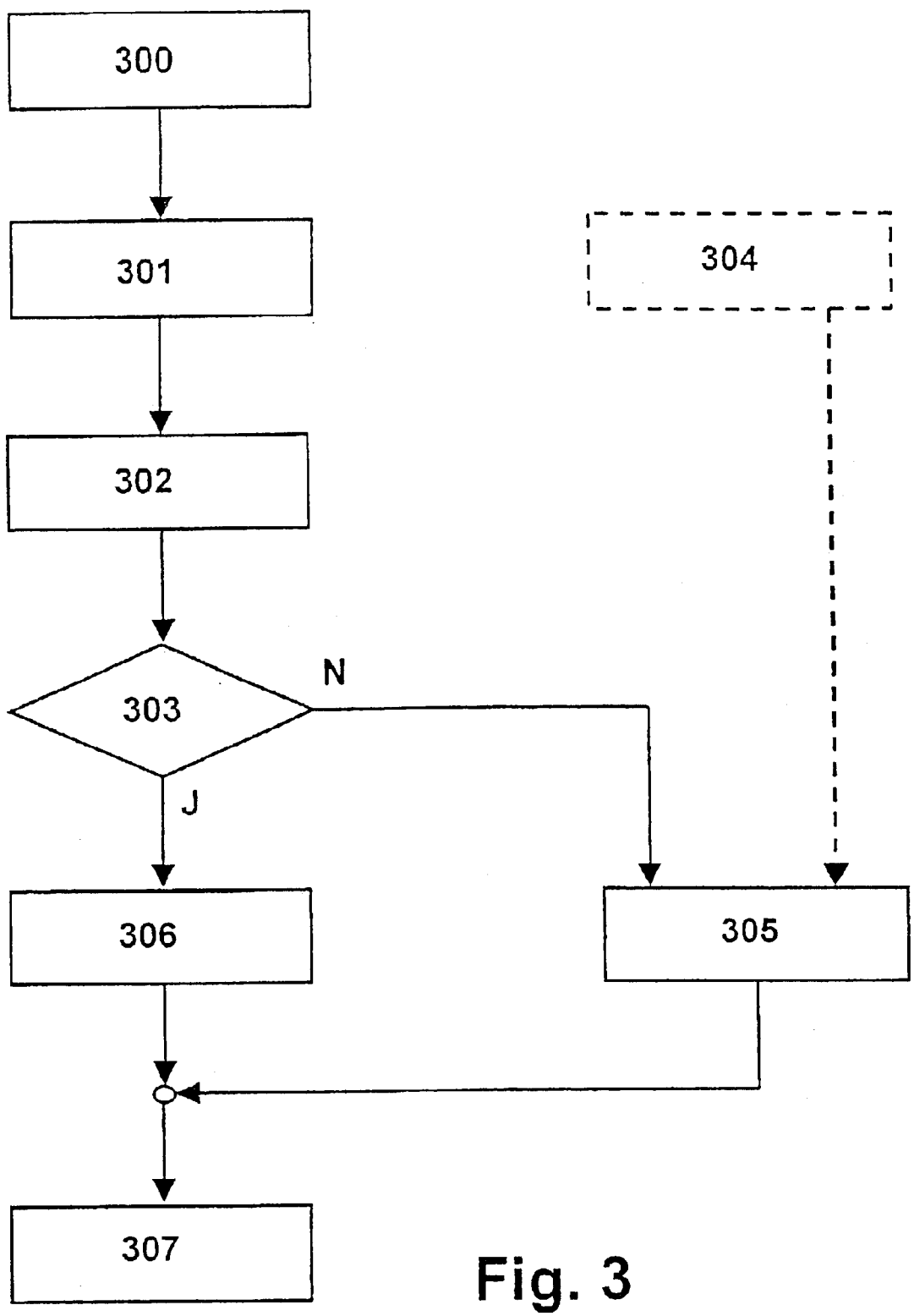
FIG. 3 shows an example embodiment of the method according to the present invention for variant determination of the component and/or system environment on the basis of a flow chart.

This one-time-learnable data OTL may be used in two different manners in the example method described below in conjunction with FIG. 3. first, the respective variant for the control unit is determined from the environment data, and this variant, i.e., a variable representing it, is entered as OTL data into the EEPROM memory area of nonvolatile memory 106. Expediently, this OTL data may also be entered into internal memory 102 in the microcomputer for variant identification. For example, the various variant data (e.g., normalized values of the CAN data transmitted, etc.) is stored in a nonvolatile memory area, e.g., in memory 106, e.g., in a nonerasable form, i.e., protected from erasing. Switching, i.e., changing variants and/or selection of a variant in the regulator program may occur during ongoing operation, as illustrated in FIG. 3.

Additionally, the variant data itself, i.e., the variant-specific environment data, may be determined directly as OTL data from the environment data (e.g., normalized values sent to CAN) and entered into the EEPROM memory area. In both cases, writing to the memory area of the nonvolatile memory, e.g., in memory 102 or 106, occurs only once, if no OTL data was already present prior to that, and it may be expediently performed at first startup.

The example illustrated in FIG. 2 describes a system for regulating the speed of a vehicle, in particular taking into account vehicles driving ahead, i.e., regulating the driving speed and/or the distance from the next vehicle ahead. It is mounted on a vehicle together with one of the peripheral elements from FIG. 1, e.g., peripheral element 111, a radar sensor for detecting vehicles ahead. This radar sensor, e.g., as a building block of a vehicle comfort system such as ACC (adaptative cruise control) as mentioned above, is separate from and combinable with control unit 1 as a compact unit. Such a compact system is illustrated in FIG. 1 as control unit 214.

In the case of the radar sensor, information may be constantly being processed regarding the distance and the relative speed of the vehicle with respect to other vehicles and the road conditions. The functional division of this processing, whether in the sensor itself or in the respective control unit, may be selected as desired. The basic functions of the system described here involve regulation of driving speed either at a setpoint, namely the desired speed here, or at the speed of a vehicle driving ahead, if the latter vehicle is driving at a slower speed than the desired speed and if that vehicle is within the range of detection of the radar sensor. This sensor may be, for example, part of a microwave radar (e.g., FMCW, i.e., frequency-modulated continuous wave or pulsed radar) or an infrared LIDAR (light detection and range, e.g., also a Doppler LIDAR) and measures the distance, the relative speed and the angle of objects, in particular vehicles driving ahead within the detection range. In addition to the measurement, predictions, e.g., regarding future routes of the vehicle or the future route range, etc. are also possible.

By analysis in control unit 214, for example, a measure, in particular in the form of a request, is implemented in engine control 211 or brake and transmission control 213 and 215.

Likewise, transmission control 215 and engine control 211 exchange relevant data, e.g., torques, over the torque interface.

For example, ACC setpoint values are transmitted to engine control 211 in percentage values, and the engine control selects the maximum value itself. Different engine controls (e.g., diesel, gasoline engine and variants thereof such as direct gasoline injection in the case of a gasoline engine or common rail and pump-nozzle in the case of a diesel engine) permit and/or require different maximum values.

Likewise, transmission control unit 215 sends a signal over CAN bus 208 indicating whether this vehicle has an automatic transmission or a CVT (continuously variable transmission) or an automated manual transmission.

In addition, combination instrument 212 sends a signal which indicates whether it is a display having mile units or kilometer units and thus also whether the speed is given in miles per hour or kilometers per hour. For example, some embodiments of combination instruments provide such information in the form of a remote message on the CAN bus, i.e., on inquiry by another control unit, e.g., ACC control unit 214, a corresponding message is sent by combination instrument 212.

Two possibilities for using this and other environment data according to the present invention may be explained on the basis of a flow chart in FIG. 3. In block 300 there is an initial startup, e.g., by an external command, power on, i.e., activating the power supply or operating the start switch, e.g., the ignition switch, in particular after installation in a vehicle.

Then signals, i.e., environment data on the system environment, are entered in block 301 by ACC control unit 214. In block 302, either vehicle-individual data, i.e., control variant-individual data, i.e., the variant-specific environment data is determined or the respective variant is determined from the environment data. One possibility here may be to provide all relevant data described for the entire system with its own identification by the individual components. This may have the feature that control unit 214 would only have to compare the identification and store the corresponding data at addresses provided for this purpose, so that no data need be present in advance in control unit 214 for comparison, only the identification(s). Thus an ACC control unit that is unlearned with respect to the variant-dependent data may be incorporated into the system, and then it learns its concrete determination, i.e., control variant, more or less only with the one-time initial storage of this environment data.

Depending on whether or not the variant has been determined from the environment data or the variant-determining environment data itself has been determined, a check is performed in query 303 to determine whether the variant has been entered as OTL data in the memory or whether the variant-determining environment data has likewise been entered as OTL data. This may be accomplished in various manners.

In the simplest case, the EEPROM content in the unlearned state is initialized with FF in hexadecimal notation, for example. The program of the control unit recognizes by this content that it is required to learn, i.e., the learning algorithm may need to be executed. A subsequent authorization of the learning process may occur in this example embodiment by the feature that a diagnostic service, for example, fills up the content again with FF, again with prior authorization.

Another example is to use an identification, e.g., a single bit, in the EEPROM as identification for learning that has occurred or not and to query in this respect.

A third example triggers the learning from the outside, e.g., input of end-of-line messages triggers the learning process.

Finally, the fourth example is for a diagnostic service to put the control unit in the learning mode.

If the learning mode is provided, i.e., no OTL data has yet been entered into the memory, then in block 305 either the variant is entered as OTL data into the EEPROM and/or the variant-determining environment data is entered as OTL data into the EEPROM. If no OTL data is yet present, this is performed exactly once, as described previously. This one-time learning in the system, i.e., in control unit 214 from system environment 211 through 213 and 215, 216 via bus 208 in the initial startup of at least the component, i.e., control unit 214, ensures that the system environment is compatible with the control unit, i.e., the environment corresponds to the data learned. If it is found in query 303 that one-time learning data has already been entered as stated previously, then the system goes to block 306, where the variant, i.e., the vehicle-individual or variant-determining data may be monitored by comparison of the data which is still being sent on bus 208 with the stored OTL data. The remaining program sequence occurs in block 307, starting from block 306 or block 305.

After the first startup, a change in the OTL data in the EEPROM, as well as deletion by authorization, e.g., by an authorized tool such as a diagnostic tester or an authorized site, e.g., customer service may be performed only via block 304. In the authorization, blockage of the learning mode after one-time programming of the OTL data may be canceled by a code, i.e., a key, and by checking it in the component. Likewise, such an authorization may be performed by coded plugs and/or components. For example, end-of-line variant coding may be secured to a significant extent as a potential source of error in the manufacturing process with the steps of self-programmed OTL data and the subsequent authorization in the case of changes in the data.

In an example application of this method and/or device, data enterable previously using special diagnostic tools may be programmed via the existing communication pathways of the control unit, e.g., the CAN bus, at a reduced complexity, e.g., using end-of-line CAN messages. In addition to end-of-line messages, of course other messages, in particular additional and/or other CAN messages of the vehicle CAN bus may be used for this purpose.

Another example application is, for example, when a self-diagnosis, e.g., calibration of a sensor and/or storage of an offset value occur only one time, e.g., by driving a defined route in particular at the end of the line.

Likewise, when manufacturing control units, the control unit may be set for learning, so that the control unit in the system learns the data automatically without authorization. Thus, for example, the manufacturer of a control unit may make available to the manufacturer of a vehicle a control unit or component that may be installed subsequently in a flexible manner.

As mentioned previously, only this example embodiment may be limited to an automotive application. Of course equivalent applications may be used with all other systems of a comparable structure, e.g., in machine tools, in particular machining centers, in the case of subsequent installation of a component, e.g., a control unit for a machining center or intelligent sensors and actuators.

What is claimed is:

1. A method of controlling a system, the control being implementable in different variants, comprising:

providing a component operable in the different variants according to a configuration of the system;

receiving at least one signal by the component from the system via an interface;

at least one of altering and preselecting one of the variants as a function of the at least one signal upon a first startup of the component; and requiring authorization to at least one of alter and select the variant after the first startup.

2. The method according to claim 1, wherein the system is in a motor vehicle.

3. A method of determining a variant of a control of a system, the control being implementable in different variants, comprising:

providing a component operable in the different variants according to a configuration of the system;

receiving at least one signal by the component from the system via an interface;

at least one of altering and preselecting one of the variants as a function of the at least one signal upon a first startup of the component; and requiring authorization to at least one of alter and select the variant after the first startup.

4. The method according to claim 3, wherein the system is in a motor vehicle.

5. The method according to claim 1, further comprising:

causing the component to automatically determine the variant a single time based on the at least one signal, upon the first startup of the component.

6. The method according to claim 1, further comprising:

connecting the component to at least one additional component; and conveying at least one signal from the additional component to the component via the interface.

7. The method according to claim 6, wherein the component includes a control unit.

8. The method according to claim 1, further comprising:

entering at least one variable representing at least one of the variant and the at least one signal into a memory of the component; and determining, by the component, the variant on a basis of the at least one variable.

9. The method according to claim 1, further comprising:

performing a check to determine whether a variable representing at least one of the variant and the at least one signal has been entered into a memory of the component; and at least one of deleting and altering the variable only with authorization if the variable has been entered into the memory.

10. The method according to claim 9, wherein the check is performed by the component.

11. A configurable device operative within a system, comprising:

a first component including an arrangement for at least one of selecting and altering one of the variants for control of the first component as a function of at least one signal upon a first startup of the first component, the arrangement allowing an additional at least one of alteration and selection of the variant for control of the first component subsequent to the first startup only with authorization; and an arrangement for determining the variant for control of the first component according to a configuration of the system.

12. The device according to claim 11, wherein the system is in a motor vehicle.

13. A device for control of a system, the control being implementable in different variants, comprising:

a first component for receiving at least one signal and including an arrangement for at least one of selecting and altering one of the variants for control of the first component as a function of the at least one signal when the first component is first started, the arrangement only allowing with authorization an additional at least one of alteration and selection of the variant for control of the first component subsequent to an initial startup; and at least one additional component interconnected with the first component during operation, for outputting the at least one signal.

14. The device according to claim 13, wherein the system is in a motor vehicle.

15. A component for controlling a system, the control being implementable in different variants and a plurality of variants of the component being producible according to a configuration of the system, comprising:

an arrangement for receiving at least one signal via an interface from the system, and for at least one of determining and detecting one of the variants as a function of the at least one signal upon a first startup of the component, the arrangement configured to allow another one of alteration and selection of the variant subsequent to the first startup only with authorization.

16. The component according to claim 15, wherein the component is a control unit.

17. The component according to claim 15, wherein the system includes a motor vehicle.

* * * * *